1

2,829,144

PROCESS FOR PRODUCING NIACIN FROM ISOCINCHOMERONIC ACID

Roland G. Benner, Summit, N. J., assignor, by mesne assignments, to Warner-Lambert Pharmaceutical Company, Morris Plains, N. J., a corporation of Delaware No Drawing. Application April 14, 1955
Serial No. 501,440

1 Claim. (Cl. 260—295.5)

This invention relates to the preparation of niacin, or nicotinic acid, and relates more particularly to the preparation of niacin by an improved process comprising the decarboxylation of isocinchomeronic acid. Niacin is an important nutritional factor and is used in the prevention and treatment of pellagra. It is particularly useful nutritionally in the form of its amide since niacinamide does not cause the objectionable vasodilitation which is frequently observed where niacin is employed.

An object of this invention is the preparation of niacin by a novel process involving the decarboxylation of isocinchomeronic acid.

Other objects of this invention will appear from the following detailed description.

The synthesis of isocinchomeronic acid, or 2,5-pyridine dicarboxylic acid by the oxidation of 2-methyl-5-ethyl-pyridine is well known. The desired oxidation may readily be accomplished in an aqueous medium utilizing an oxidizing agent such as potassium permanganate or even aqueous bichromate. The oxidation of 2-methyl-5-ethyl-pyridine to isocinchomeronic acid may also be carried out in a medium comprising selenium and fuming sulfuric acid. On a commercial scale, the production of isocinchomeronic acid by the oxidation of 2-methyl-5-ethyl-pyridine is more feasible if the oxidizing agent employed is nitric acid. One embodiment of this process is fully described in U. S. Patent No. 2,524,957. Excellent yields of isocinchomeronic acid are obtained by this process and by various modifications of this process. Under certain conditions, especially at higher temperatures, the isocinchomeronic acid formed is decarboxylated during the course of the oxidation reaction. In the process described in Swiss Patent No. 234,588 niacin is obtained directly with the decarboxylation taking place in the nitric acid oxidation medium itself without any separation of the isocinchomeronic acid formed. The optimum reaction conditions for oxidation and decarboxylation are not analogous. The oxidation proceeds most favorably at temperatures of from about 175 to about 195° C. while decarboxylation, although it will take place at temperatures within this range, is more easily and more rapidly effected at higher temperatures. A balance of the advantages of a separate decarboxylation over the combined oxidation and decarboxylation favors separate decarboxylation, especially where nitric acid is employed, due not only to the excessive corrosion experienced with nitric acid at the higher temperatures where decarboxylation is most rapid, but also to possible decomposition under the drastic conditions inherent whenever nitric acid is used at high temperatures.

I have now found that isocinchomeronic acid may be readily and conveniently decarboxylated to yield niacin by heating the isocinchomeronic acid in a non-reactive liquid vehicle. Examples of liquid vehicles suitable for carrying out my novel decarboxylation process are mineral oil, tetralin and water. The decarboxylation of free isocinchomeronic acid in a neutral medium will occur at temperatures as low as 120° C. but at that temperature, the rate at which decarboxylation takes place is low. Decarboxylation is satisfactorily rapid at temperatures of from about 190 to 220° C. Temperatures as high as 245° C. are also suitable. Using mineral oil as the heating medium, this temperature may be reached without the use of pressure. At higher temperatures the niacin formed is found to sublime from the mineral oil heating medium. With suitably designed equipment, the tendency of the niacin formed toward sublimation offers a method for the partial separation of the niacin from the decarboxylation reaction mixture in a highly purified form.

When using water as the heating medium for decarboxylating isocinchomeronic acid, the decarboxylation may be carried out at temperatures as low as 175° C. Since the decarboxylation reaction rate is quite low at this temperature, higher temperatures, i. e. about 200° C., are preferred.

The mineral oil used may be any paraffin oil obtained from petroleum. These oils consist of a mixture of hydrocarbons and are available in both U. S. P. and technical grades. These oils are valuable heat transfer media and are also called heat transfer oil.

The decarboxylation of isocinchomeronic acid to niacin is essentially a time and temperature relationship. At higher temperatures the reaction rate is increased. When decarboxylation is carried out in a bomb or other sealed vessel, the internal pressure may be controlled by periodically venting the carbon dioxide. The particular reaction temperature employed is dictated, in part, by the equipment available, since pressure is necessary when water is used as the heating medium, and by the rate at which it is desired to effect the decarboxylation. Since niacin itself may be decarboxylated to pyridine if the temperature is sufficiently high, care should be taken to avoid reaction conditions where the temperature is high enough to accomplish this or the duration of the decarboxylation reaction so prolonged that the niacin initially formed is itself decarboxylated to any appreciable degree since this, obviously, will affect the yield adversely.

In order further to illustrate my invention but without being limited thereto, the following examples are given:

*Example I*

2.3 parts by weight of isocinchomeronic acid are added to white mineral oil, the mixture heated to 216.5° C. and maintained at about that temperature for 2 hours. Measurement of the carbon dioxide evolved indicates about 99.4% decarboxylation of the isocinchomeronic acid to niacin. The niacin separated from the reaction mixture melts at 231–233° C.

*Example II*

About 2.5 grams of isocinchomeronic acid are added to 30 cc. of water, the mixture sealed in a tube and the sealed tube heated at about 200° C. for 2 hours. The tube is cooled and the niacin crystallizes from the water. The niacin thus separated is filtered off and dried and melts without further treatment at a temperature of 236–237° C., indicating a high order of purity.

*Example III*

2.86 grams of isocinchomeronic acid are added to tetralin and the mixture heated at about 190° C. for just over 1 hour. The reaction mixture is cooled and the crude niacin which crystallizes out is separated. Water is added to the crude niacin and the mixture boiled with decolorizing carbon. The hot solution is then filtered. After cooling, the purified niacin crystallizes out of the filtrate. The niacin which separates melts at 236–238° C. The yield of purified niacin obtained is 39% of theoretical.

*Example IV*

75 grams of isocinchomeronic acid are added to water and the mixture placed in a bomb and heated at 190–210° C. for one and one-half hours. The internal pressure in the bomb is maintained below 300 p. s. i. g. by periodic venting. The contents of the bomb are emptied into a beaker and the bomb washed with water. The wash water is combined with the bomb contents and the total made up to a volume of 500 cc. The mixture is then heated until complete solution is obtained, and the mixture filtered. The filtrate is again heated to boiling, 10 grams of decolorizing carbon added, and the whole digested for 20 minutes. The mixture is again filtered and, after the filtrate is chilled, the precipitated solid is filtered off, washed with ice water and dried. 32 grams of niacin are thus obtained, the product melting at 236.5–238° C. An additional 5 grams of niacin are obtained from the filtrate for a total yield of 67% of theory.

While free isocinchomeronic acid is preferable for effecting decarboxylation to niacin, the half or double alkali-metal, e. g. sodium, salt of the acid may also be decarboxylated to niacin.

It is understood that the foregoing detailed description is given merely by way of illustration and that many variations may be made therein without departing from the spirit of my invention.

Having described my invention, what I desire to secure by Letters Patent is:

The method of making niacin from isocinchomeronic acid by the decarboxylation thereof by heat with recovery of the niacin produced, characterized by mixing isocinchomeronic acid in water, and heating the mixture to a decarboxylating temperature range above 180° C. and maintaining such temperature range until the decarboxylation is substantially complete.

References Cited in the file of this patent

UNITED STATES PATENTS 2,702,802   Aries _____ Feb. 22, 1955